(12) United States Patent
Baba et al.

(10) Patent No.: US 8,584,237 B2
(45) Date of Patent: Nov. 12, 2013

(54) IMPROPER COMMUNICATION DETECTION SYSTEM

(75) Inventors: Shunsuke Baba, Musashino (JP);
Kazuya Suzuki, Musashino (JP);
Hidehiko Wada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 171 days.

(21) Appl. No.: 13/195,987

(22) Filed: Aug. 2, 2011

(65) Prior Publication Data

US 2012/0030761 A1    Feb. 2, 2012

(30) Foreign Application Priority Data

Aug. 2, 2010    (JP) .................................. 2010-173576

(51) Int. Cl.
*H04L 29/14*    (2006.01)

(52) U.S. Cl.
USPC .................... 726/23; 726/22; 726/24; 726/25; 713/165; 713/166; 713/167

(58) Field of Classification Search
USPC ................................ 726/22–25; 713/165–167
See application file for complete search history.

(56) References Cited

U.S. PATENT DOCUMENTS

| 6,895,432 | B2 * | 5/2005 | Ando et al. | 709/220 |
| 6,922,724 | B1 * | 7/2005 | Freeman et al. | 709/223 |
| 7,076,556 | B1 * | 7/2006 | Brock et al. | 709/228 |
| 7,752,662 | B2 * | 7/2010 | Shulman et al. | 726/22 |
| 2004/0199576 | A1 * | 10/2004 | Tan | 709/203 |
| 2008/0295169 | A1 * | 11/2008 | Crume | 726/22 |
| 2010/0235879 | A1 * | 9/2010 | Burnside et al. | 726/1 |
| 2011/0107421 | A1 * | 5/2011 | Mahone et al. | 726/22 |

FOREIGN PATENT DOCUMENTS

JP    2005-128784 A    5/2005

* cited by examiner

*Primary Examiner* — Kambiz Zand
*Assistant Examiner* — Tongoc Tran
(74) *Attorney, Agent, or Firm* — Westerman, Hattori, Daniels & Adrian, LLP

(57) ABSTRACT

An improper communication detection system that acquires packets that are circulated through a plant network by mirroring and detects improper communication includes a storage unit configured to prestore a session whitelist, which is a list of sessions that can be generated in the plant network; a session determination/separation unit configured to make a determination as to a success or failure of session approval on the basis of the acquired packet and configured to generate session information indicating an approved session; and a first improper communication detection unit configured to compare the session information generated by the session determination/separation unit with the session whitelist, and configured to detect communication related to the relevant session as improper communication when the session information does not match any session in the session whitelist.

3 Claims, 6 Drawing Sheets

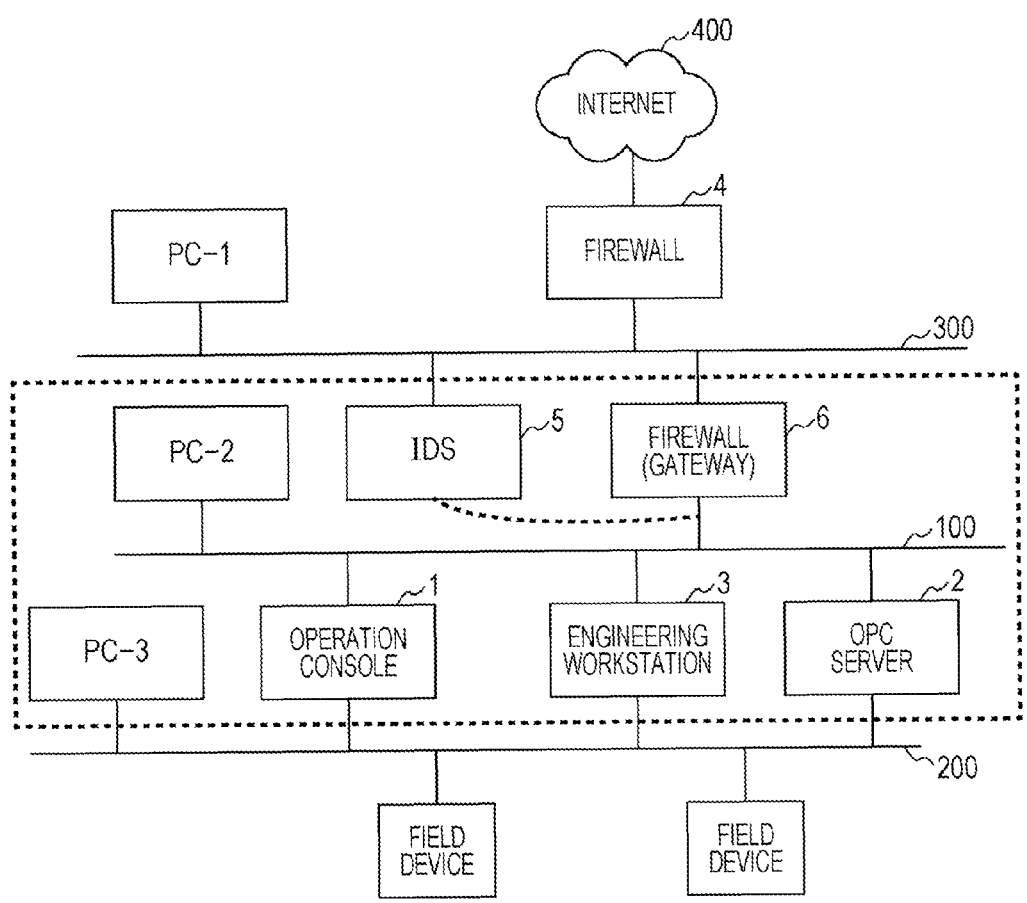

IMPROPER COMMUNICATION DETECTION SYSTEM

BACKGROUND

1. Field of the Disclosure

The present disclosure relates to an improper communication detection system that acquires packets that are circulated through a plant network by mirroring and detects improper communication. More particularly, the present disclosure relates to an improper communication detection system capable of detecting improper traffic (communication of worms, bots, or viruses, setting mistakes, man-made attacks, etc.) that can become a menace to security in a plant network, and a symptom thereof without relying on log analysis of an firewall (FW), and disposal and operation/running of an intrusion detection system (IDS).

2. Description of the Related Art

In recent years, as a process control system in industrial automation, a field control network to which field devices including sensors, such as flowmeters and thermometers, actuators, and field controllers, which form a feedback control loop, are connected, has been proposed.

Furthermore, as a control network management system for optimizing the operation of the entire plant, a plant network has been proposed.

On the other hand, in factories, IP networks that are laid down for office purposes exist. IP networks have become widely popular, and Ethernet (registered trademark) that is often used in an IP network permits a network to be flexibly constructed.

Thus, protocols that allow a plant network or a field control network to operate in an IP network have been proposed.

By using such a protocol, it becomes possible to cause a plant network or a field control network to coexist with an IP network laid down for office purposes.

That is, sensors, actuators, and the like can be directly connected to an IP network, and it becomes possible to access terminal devices more easily in the aspect of maintenance, and operation/running.

In these networks, there is a possibility that improper traffic (communication of worms, bots, and viruses, setting mistakes, man-made attacks, etc.) that can become a menace to security is generated. If improper traffic is generated, the running of the plant may be affected. For this reason, there has been a need to identify improper traffic and understand the network situation.

FIG. 6 is a configuration illustration of an embodiment of an improper communication detection system in a plant network of the related art.

In FIG. 6, a plant network 100 is a control network management system for optimizing the operation of the entire plant, and is specifically constituted by the following elements.

The plant network 100 is constituted by, for example, an operation console 1, which is a console device for controlling field devices and operating the plant, an OPC server 2, that is a server for allowing different types of industrial automation control systems to mutually operate, that shares process-derived data in a multi-vendor environment, and that transfers the data to a business system of an intranet, and an engineering workstation 3, which is a work station, whereby development and alteration of control logic that is incorporated into devices belonging to a field control network, and other terminal devices (PC-2, PC-3) are performed. The operation console 1, the OPC server 2, and the engineering workstation 3 are interconnected through the network 100.

The plant network 100 is located in a water purification plant, another kind of plant or the like, and is, as a process control system in industrial automation, connected to a control bus network 200 constituted by field devices (devices including sensors of a flowmeter, a thermometer and the like, an actuator, and a field controller) forming a feedback control loop. Specifically, the operation console 1, the engineering workstation 2, and the OPC server 3 are interconnected through the control bus network 200 and the plant network 100.

The plant network 100 is connected to an IP network (hereinafter referred to as an intranet) 300 laid down for office purposes in a plant factory.

The intranet 300 is constituted by a PC-1, which is a terminal device for office purposes, and is connected to the Internet 400 through a firewall (hereinafter referred to as an FW) 4 having a function of limiting communication among networks.

Furthermore, the intranet 300 is connected to the plant network 100 through an FW 6. An intrusion detection system (IDS) 5, to which the intranet 300 is connected, is controlled by the PC-1 and the like. The IDS 5 is also connected to the connection line of the FW 6 and the plant network 100.

Here, regarding the plant network 100, in the portion encircled by the dotted line, in recent years, an apparatus having Windows™ (registered trademark) installed therein and open technology have been introduced. Consequently, there has been a security risk. By detecting intrusion by using the IDS 5, security of the plant network is ensured.

The IDS 5 forms an improper communication detection system of the related art. The IDS 5 detects improper traffic by monitoring the plant network 100, and thus ensures the security of the plant network 100.

More specifically, in a case where the IDS 5 is of a signature type, the IDS 5 obtains a packet that is transmitted and received between the plant network 100 and the FW 6, and checks the obtained packet against the information (hereinafter referred to simply as a signature) on prestored improper packets. When the content of the packet matches the signature, the IDS 5 determines the packet to be an improper packet, and blocks communication.

In a case where the IDS 5 is of an anomaly type, the IDS 5 judges the case in which the current state is deviated from the normal state that has been defined in advance by a statistical technique to be abnormal, and blocks the passage of an improper packet.

As a result, it becomes possible for the improper communication detection system in the plant network of the related art to make connection to a general-purpose network, such as the Internet, through a signature type (or anomaly type) IDS, thereby making it possible to detect the intrusion of an improper packet so as to block this packet.

An example of related art document related to an improper communication detection system in a plant network of the related art includes Japanese Unexamined Patent Application Publication No. 2005-128784.

The improper communication detection system in the plant network of the related art is often an environment in which applications and an operation system (OS), for which support has been expired, coexist. Consequently, the influence in a case where attack traffic (improper traffic) flows is larger than that in the case of an intranet, which is problematical.

Furthermore, another problem is that attack traffic (improper traffic) may affect the operation of a field device connected to a control bus network, causing a plant to not be capable of being operated appropriately.

Another problem is the following. Even if a vulnerability is found in a device connected to a plant network, and a security patch of software or the like provided in the relevant device becomes available, unscheduled stoppage of the running of the plant, and unscheduled stoppage of a process control system affect production planning for the reasons that it is not possible that the system is immediately stopped and a patch is used.

With respect to these problems, a system that monitors traffic by an IDS in the manner described above or that analyzes the log of an FW and monitors the plant network has been proposed. However, there are the following problems (A) to (C).

(A) In monitoring using an IDS, an attack can be detected only after attack traffic (improper traffic) flows through a plant network, and the operation of a field device connected to the control bus network may be affected, which is problematical.

That is, in the plant network, if attack traffic flows, damage increases. Consequently, monitoring using an IDS, in which detection is not possible in advance, is insufficient, which is problematical.

(B) In monitoring using an IDS, since only a known attack can be detected, attack traffic (improper traffic) using a new attack pattern cannot be detected, which is problematical.

(C) Monitoring of the log of an FW has problems in that a special skill is necessary and that it is difficult to monitor traffic in real time.

SUMMARY

The present disclosure has been made to solve such problems. An object of the present disclosure is to realize an improper communication detection system capable of detecting improper traffic (communication of worms, bots, and viruses, setting mistakes, man-made attacks, etc.) that can become a menace to security in a plant network, and a symptom thereof without relying on log analysis of an FW (firewall), and disposal and operation/running of an IDS (intrusion detection system).

In order to achieve the above-mentioned object, according to an embodiment of the present disclosure, there is provided an improper communication detection system that acquires packets that are circulated through a plant network by mirroring and that detects improper communication, the improper communication detection system including: a storage unit for prestoring a session whitelist, which is a list of sessions that can be generated in the plant network; a session determination/separation unit configured to make a determination as to a success or failure of session approval on the basis of the acquired packet and configured to generate session information indicating an approved session; and first improper communication detection unit for comparing the session information generated by the session determination/separation unit with the session whitelist, and for detecting communication related to the relevant session as improper communication when the session information does not match any session in the session whitelist.

In an embodiment of the improper communication detection system, the storage unit may prestore a traffic pattern whitelist that is a list of traffic patterns that can be generated in the plant network, and the session determination/separation unit may include a traffic pattern determination unit for making a determination as to a success or failure of session approval on the basis of the acquired packets and generating session non-approved packet information indicating a packet for which a session has not been approved, and for generating traffic pattern information indicating a traffic pattern of a packet for which a session has not been approved on the basis of the session non-approved packet information, and a second improper communication detection unit for comparing the generated traffic pattern information with the traffic pattern whitelist, and detecting communication related to the relevant traffic pattern information as improper communication when the traffic pattern information does not match any traffic pattern in the traffic pattern whitelist.

In an embodiment of the improper communication detection system, the session determination/separation unit may include a whitelist generation unit for generating session feature information indicating information of sessions that were approved in the past on the basis of the acquired packets, and for generating the session whitelist on the basis of the session feature information.

In an embodiment of the improper communication detection system, the session determination/separation unit may include a session detecting work memory for storing the acquired packets in a time-series manner in a plurality of memory blocks, a session information memory for storing packets for which the session has been approved in a time-series manner in a plurality of memory blocks, data processor for, when a packet with which a session corresponding to the acquired packet is approved is detected from the packets stored in the oldest memory block of the session detecting work memory, appending approval information indicating that the session has been approved to the relevant acquired packet, and for storing the packet in the most recent memory block of the session detecting work memory, and a periodic processing unit for determining that the acquired packet in the session detecting work memory in which a packet with which the corresponding session is approved has not been stored has a session approved result when approval information indicating that the session has been approved is appended to the packet and is recorded in the session information memory, generating session information on the basis of the relevant session, and storing this packet in the most recent memory block of the session information memory.

In an embodiment of the improper communication detection system, the session determination/separation unit may include a queue memory for storing the packet for which the session has not been approved, and the periodic processor may determine that the acquired packet in the session detecting work memory in which a packet with which the corresponding session is approved has not been stored, approval information indicating that the session has been approved having not been appended in the session information memory, is a session non-approved packet, may store this packet in the session non-approved packet information, and also may store this packet in the queue memory.

According to an embodiment of the present disclosure, there is provided a storage unit for prestoring a session whitelist, which is a list of sessions that can be generated in the plant network; a session determination/separation unit configured to make a determination as to a success or failure of session approval on the basis of the acquired packet and configured to generate session information indicating an approved session; and a first improper communication detection unit for comparing the session information generated by the session determination/separation unit with the session whitelist, and for detecting communication related to the relevant session as improper communication when the session information does not match any session in the session whitelist. Thus, the present disclosure is effective in that it is possible to detect improper traffic (communication of worms, bots, and viruses, setting mistakes, man-made attacks, etc.)

that can become a menace to security in a plant network, and a symptom thereof without relying on log analysis of an FW (firewall), and disposal and operation/running of an intrusion detection system (IDS).

According to another embodiment of the present disclosure, the storage unit prestores a traffic pattern whitelist that is a list of traffic patterns that can be generated in the plant network, and the session determination/separation unit includes a traffic pattern determination unit for making a determination as to a success or failure of session approval on the basis of the acquired packets and generating session non-approved packet information indicating a packet for which a session has not been approved, and for generating traffic pattern information indicating a traffic pattern of a packet for which a session has not been approved on the basis of the session non-approved packet information, and a second improper communication detection unit for comparing the generated traffic pattern information with the traffic pattern whitelist, and detecting communication related to the relevant traffic pattern information as improper communication when the traffic pattern information does not match any traffic pattern in the traffic pattern whitelist. Thus, the present disclosure is effective in that when a session for User Datagram Protocol (UDP) is to be approved, even with communication using a protocol that makes the transmission of a response packet unnecessary, it is possible to detect improper traffic (communication of worms, bots, and viruses, setting mistakes, man-made attacks, etc.) that can become a menace to security in the plant network, and a symptom thereof without relying on log analysis of an FW, and disposal and operation/ running of an IDS.

The improper communication detection system according to the present disclosure is configured as described above. Thus, the improper communication detection system of the present disclosure is effective in that not only can improper traffic be detected in real time, but also a packet (improper communication) that does not conform with a whitelist can be detected in real time.

Furthermore, the improper communication detection system according to the present disclosure is configured as described above. Thus, the improper communication detection system of the present disclosure is effective in that the symptom of improper traffic due to an activity of a worm or a bot can be detected in a case where a worm or a bot virus is infected in a plant network (also through a network, or through a USB memory rather than through a network).

BRIEF DESCRIPTION OF THE DRAWINGS

FIG. 6 is a configuration diagram illustrating an embodiment of an improper communication detection system in a plant network of the related art.

DETAILED DESCRIPTION OF EMBODIMENTS

First Embodiment

In the present disclosure, since communication of worms, viruses, or bots, and communication of a symptom thereof reach a default gateway of a plant network, it is considered that if traffic of a default gateway is monitored, these menaces of security can be found.

Summary of the Configuration

Figure 1:
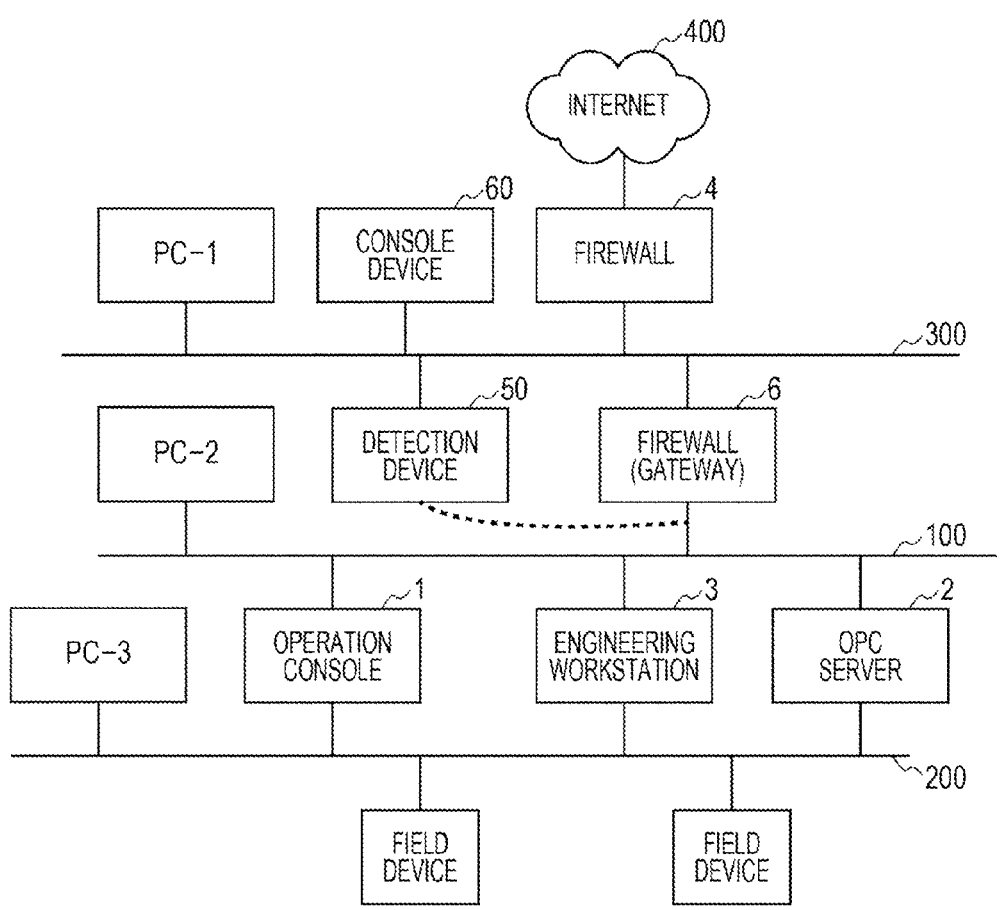
FIG. 1 is a configuration diagram illustrating an embodiment of an improper communication detection system according to the present disclosure.

The present disclosure will be described below in detail with reference to the drawings. FIG. 1 is a configuration illustration illustrating an embodiment of an improper communication detection system according to the present disclosure. Components which are common to those of FIG. 6 are designated with the same symbols, and the description thereof is omitted as appropriate.

The differences from FIG. 6 are that, mainly, a storage unit prestores a session whitelist, which is a list of sessions that can be generated in the plant network; a session determination/separation unit makes a determination as to the success or failure of session approval on the basis of an acquired packet and generates session information indicating an approved session; a first improper communication detection unit compares the session information generated by the session determination/separation unit with the session whitelist, and if the session information does not match any session in the session whitelist, the communication related to the relevant session is detected as improper communication.

In FIG. 1, an improper communication detection system 1 of the present disclosure is mainly constituted by a detection device 50 that is connected to the intranet 300 and is also connected to the connection line of the FW 6 and the plant network 100. The improper communication detection system 1 of the present disclosure may also be constituted by a console device 60 that is connected to the intranet 300 and that displays the detection result of the detection device 50.

In a case where the detection device 50 detects improper traffic by monitoring the plant network 100 and finds a menace of security, the detection device 50 notifies the console device 60 of the menace as an event, and thereby ensures the security of the plant network 100.

In order to prevent the plant network 100 from being affected as a result of the detection device 50 being disposed in the improper communication detection system of the present disclosure or prevent the plant network 100 from being attacked as a result of the detection device 50 being used as a steppingstone by an attacker, the plant network 100 is configured by considering the following items.

(I) After mirroring of traffic on the plant network 100 side of the FW (or layer 3 switch), which exists in the default gateway, is performed, the traffic is captured.

(II) No direct connection is made to the plant network 100.

Specifically, although not particularly shown in the figures, the detection device 50 captures (acquires) a packet that is circulated through the plant network by performing mirroring from a switch (not shown) through which the FW 6 and the plant network 100 are connected, and detects improper communication.

Specifically, the detection device 50 sets one of the ports of a switch (not shown) as a mirror port for copying and outputting a packet that flows to a specified port (source port), connects the communication unit (monitoring interface, etc.) of the detection device to the mirror port, and captures a packet that is circulated through the plant network 300.

Figure 2:
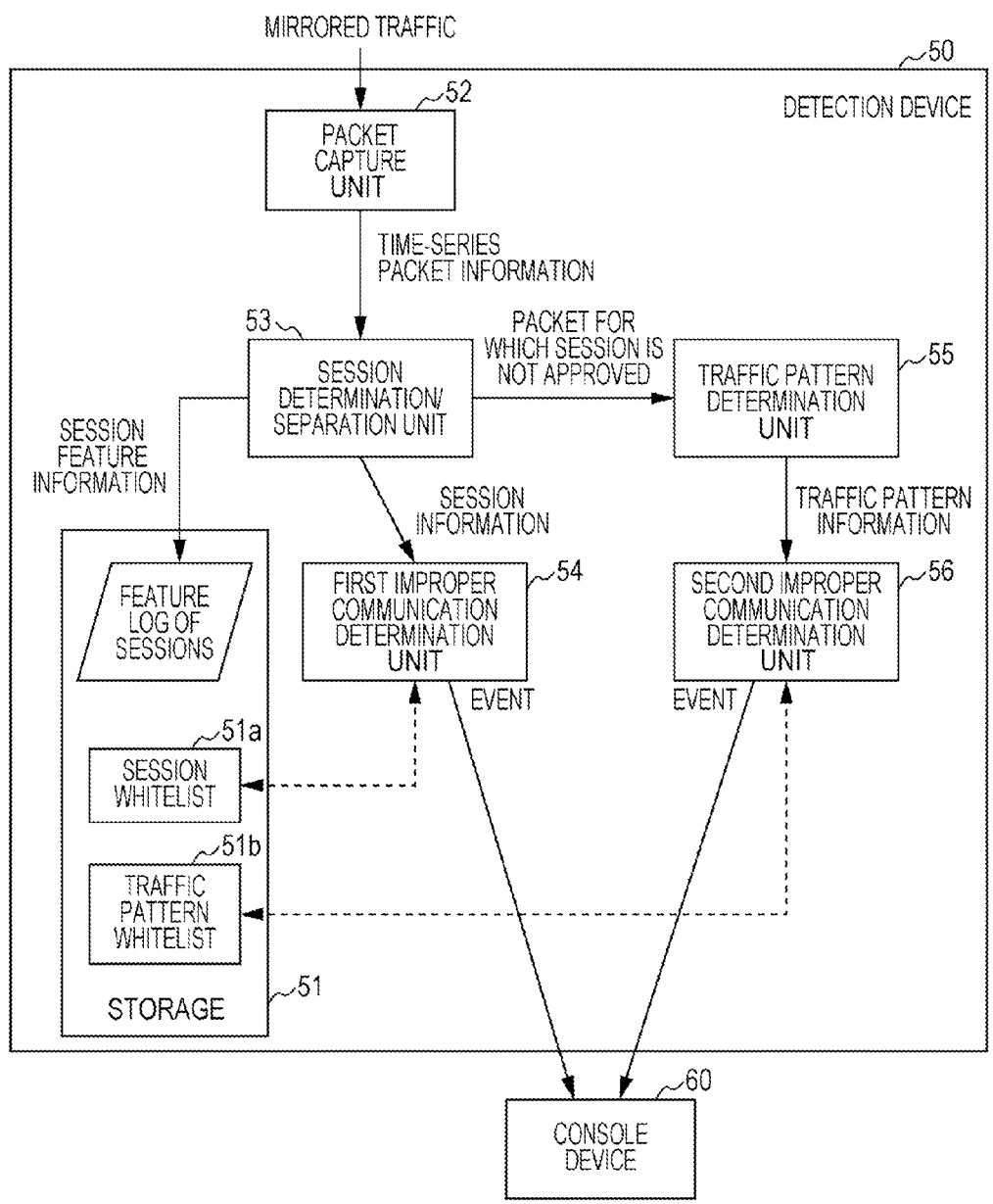
FIG. 2 is a configuration diagram illustrating a detection device of FIG. 1.

FIG. 2 is a configuration illustration of the detection device of FIG. 1.

In FIG. 2, the detection device 50 is constituted by storage unit 51 that prestores a session whitelist 51a, which is a list of sessions that are generated by the plant network 100, packet capture unit 52 that acquires a packet that is circulated through the plant network 100 by mirroring from a switch (not shown) through which the FW 6 and the plant network 100 are connected, a session determination/separation unit 53 that makes a determination as to the success or failure of the session approval on the basis of the packet acquired by the packet capture unit 52 and that generates "session information" indicating the approved session, and first improper communication detection unit 54 that compares the "session information" generated by the session determination/separation unit 53 with the session whitelist 51a and that detects communication related to the relevant session when the session information does not match any session in the session whitelist 51a as *improper communication*.

Here, an example of the session whitelist 51a is shown in Table 1 below.

TABLE 1

Example of session whitelist

| Transmission Source | Transmission Destination | Service |
|---|---|---|
| 192.168.23.8 | 172.16.7.80 | TCP/20002 |
| 192.168.20.0/24 | 192.168.20.0/24 | UDP/137 |
| 192.168.20.0/24 | 10.10.10.10 | TCP/80 |
| ... | ... | ... |

Furthermore, the storage unit 51 may be one that prestores a traffic pattern whitelist 51b, which is a list of traffic patterns that can be generated in the plant network 100. At this point, an example of the traffic pattern whitelist 51b is shown in Table 2 below. The traffic pattern whitelist 51b may be generated in such a manner that the present system is operated for a fixed period, and traffic patterns are collected.

TABLE 2

Example of traffic pattern whitelist

| Transmission Source | Transmission Destination | Traffic Pattern Signature |
|---|---|---|
| 10.10.0.0/16 | 203.95.26.0/24 | 9173416f5cca3e16ed76038dbe38c76b |
| 10.10.0.0/16 | 203.95.26.0/24 | aad96e702f9d3d5ed5e1dabb70f1f6a2 |
| 10.10.0.0/16 | 239.255.1.0/24 | e0eced278c2875ff1bec37181dea902 |
| ... | ... | ... |

The traffic pattern may be formed from six types of patterns, namely, "Normal", "Port_Scan", "Port_Scan2", "Network_Scan", "Network_Scan2", and "Network_Scan3", which are classified according to how packets are circulated, which will be described later.

Furthermore, the session determination/separation unit 53 may make a determination as to the success or failure of the session approval on the basis of the acquired packet, and generate "session non-approved packet information" indicating a packet for which a session has not been approved.

Furthermore, the session determination/separation unit 53 may generate "session feature information" indicating the actual result information of a session that was approved in the past on the basis of the acquired packet.

The session determination/separation unit 53 obtains a packet acquired from the session determination/separation unit 53 or obtains a packet acquired by the session determination/separation unit 53 from the storage unit 52.

Then, the session determination/separation device 53 may extract and generate at least one of information among the three types of information of "session information", "session feature information", and "session non-approved packet information", which are shown in Table 3 on the basis of the obtained packet.

TABLE 3

Output of session determination/separation device

| Information | Content |
|---|---|
| Session information | Information on being connected to "which service of which host" in accordance with "which protocol" from "which host" |
| Session feature information | Information on actual result of being connected to "which service of which host" in accordance with "which protocol" from "which host" |
| Packet sequence for which session is not approved | Packet sequence for which session is not approved |

Furthermore, the detection device 50 may also be constituted by traffic pattern determination unit 55 that generates traffic pattern information indicating a traffic pattern of a packet for which a session has not been approved on the basis of the session non-approved packet information, and second improper communication detection unit 56 that compares the traffic pattern information generated by the traffic pattern determination unit 55 with the traffic pattern whitelist 51b, and detects, as improper communication, communication related to the relevant traffic pattern information when the traffic pattern information does not match any traffic pattern in the traffic pattern whitelist 51b.

The packet capture unit 52 checks the content of the acquired packet, and extracts packet information that is necessary to find a set of sessions. The packet capture unit 52 extracts, for example, information shown in Table 4 below in the case of TCP/UDP/ICMP of IPv4. Then, the extracted information or the acquired packet is transmitted to the session determination/separation unit 53, or is stored in the storage unit 52.

TABLE 4

Information necessary to find set of sessions

| Protocol | Information necessary to find set of sessions | |
|---|---|---|
| TCP | Transmission source port number | Time |
| | Transmission destination port number | Transmission source IP address |
| | Sequence Number | Transmission destination IP address |
| | Acknowledgement Number | Transmission source MAC address |
| | TCP Flags | |
| UDP | Transmission source port number | Transmission destination MAC address |
| | Transmission destination port number | Protocol Number |
| ICMP | ICMP type | |
| | ICMP type | |

The first improper communication determination unit 54 obtains the session information generated by the session determination/separation unit 53, compares the session information with the session whitelist 51a stored in the storage unit 51, and transmits the comparison result (for example, the information on the detected improper communication) to the console device 60 through the communication unit. The comparison result (for example, the detected information on the improper communication) transmitted from the first improper communication determination unit 54 is displayed on the display (monitor) of the console device 60, or the like.

The traffic pattern determination unit 55 obtains session non-approved packet information generated by the session determination/separation unit 53, and generates a traffic pattern on the basis of these obtained packets. Regarding a determination/conversion algorithm, for example, the determination/conversion algorithm described in related patents and patent applications (Japanese Patent No. 4479459, Japanese Patent No. 4415380, and Japanese Unexamined Patent Application Publication No. 2007-221311) may be used.

Specifically, the traffic pattern determination unit 55 automates traffic pattern (classification) on the basis of one or a combination of both of the transmission destination port and type of the acquired packet.

For example, the traffic pattern determination unit 55 classifies traffic patterns into six types, namely, "Normal", "Port_Scan", "Port_Scan2", "Network_Scan", "Network_Scan2", and "Network_Scan3" according to the difference in how the received (acquired) packets are circulated.

The traffic pattern determination unit 55 classifies the traffic patterns as type "Normal" in a case where, for example, the number of types of transmission source port numbers of session non-approved packets is the same as the number of types of transmission destination port numbers and the number of types of addresses of the transmission destination network is the same as the number of address types of transmission destination host.

Furthermore, the traffic pattern determination unit 55 classifies traffic patterns as type "Port_Scan" in a case where the number of types of transmission source port numbers of session non-approved packets is greater than the number of types of transmission destination port numbers, and the number of types of addresses of the transmission destination network is the same as the number of address types of transmission destination hosts.

Furthermore, the traffic pattern determination unit 55 classifies traffic patterns as type "Port_Scan2" in a case where the number of types of transmission source port numbers of session non-approved packets is smaller than the number of types of transmission destination port numbers and the number of types of addresses of the transmission destination network is the same as the number of address types of transmission destination hosts.

Furthermore, the traffic pattern determination unit 55 classifies traffic patterns as type "Network_Scan" in a case where the number of types of transmission source port numbers of session non-approved packets is greater than the number of types of transmission destination port numbers and the number of types of addresses of the transmission destination network is smaller than the number of address types of transmission destination hosts.

Furthermore, the traffic pattern determination unit 55 classifies traffic patterns as type "Network_Scan2" in a case where the number of types of transmission source port numbers of session non-approved packets is the same as the number of types of transmission destination port numbers and the number of types of addresses of the transmission destination network is smaller than the number of address types of transmission destination hosts.

Furthermore, the traffic pattern determination unit 55 classifies traffic patterns as type "Network_Scan3" in a case where the number of types of transmission source port numbers of session non-approved packets is smaller than the number of types of transmission destination port numbers and the number of types of addresses of the transmission destination network is smaller than the number of address types of transmission destination hosts.

The second improper communication determination unit 56 obtains traffic pattern information generated by the traffic pattern determination unit 55, compares the traffic pattern information with the traffic pattern session whitelist 51*b* stored in the storage unit 51, and transmits the comparison result (for example, information on the detected improper communication) to the console device 60 through communication unit. The comparison result transmitted from the first improper communication determination unit 54 is displayed on the display unit (monitor) of the console device 60, or the like.

Furthermore, the session determination/separation unit 53 may generate session feature information indicating the actual result information of the session that was approved in the past on the basis of the acquired packets. The session determination/separation unit 53 may include a whitelist generation unit that generates the session whitelist 51*b* on the basis of the session feature information.

Although not particularly shown in the figures, the detection device 50 includes first communication unit that performs packet communication through the plant network 100, second communication unit that performs packet communication through the intranet 300, and a computation control unit, such as a CPU, that controls the entire detection device 50 and detects improper communication.

The storage unit 51 is, for example, a random access memory (RAM), a read only member (ROM), or the like, and stores therein, mainly, an operating system (OS), programs and applications that cause the detection device 50 to operate, data used at the time of the execution of these programs and the like, various types of information, such as path information (network information, such as the IP address and the MAC address) that reaches the console device 60 or the like.

The computation control unit starts up the OS or the like stored in the storage unit 51, and reads a stored program and executes it on the OS, thereby controlling each device or the whole units so as to cause operation specific to each device or unit to be performed. At this time, the storage unit may develop the program and the application executed by the computation control unit into a program storage area, and may temporarily store, in a work area, the input data, and data, such as processing results, which is generated at the time of the execution of the program and the application.

Figure 3:
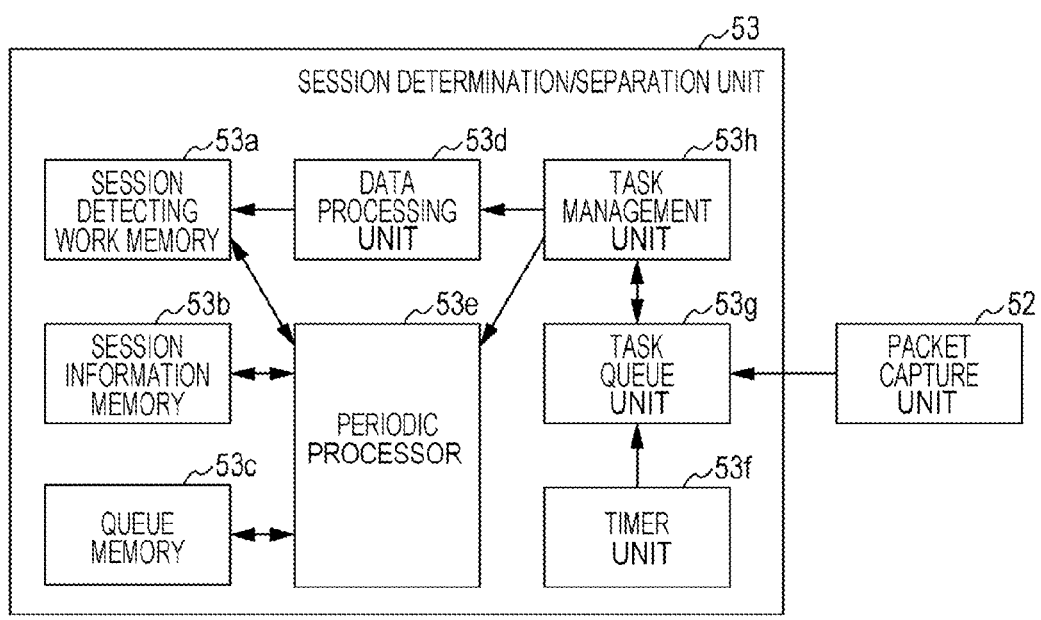
FIG. 3 is a configuration block diagram illustrating a session determination/separation unit of FIG. 2.

FIG. 3 is a block diagram of a session determination/separation unit of FIG. 2.

In FIG. 3, the session determination/separation unit 53 is constituted by a session detecting work memory 53*a* for storing acquired packets (or packet information extracted by the packet capture unit 52) in a plurality of memory blocks in a time-series manner, a session information memory 53*b* for storing packets for which a session has been approved (or packet information extracted by the packet capture unit 52) for an amount corresponding to a predetermined time period in a plurality of memory blocks in a time-series manner, and a queue memory 53*c* for storing packets for which a session has not been approved (or packet information extracted by the packet capture unit 52) for an amount corresponding to a predetermined time period.

The session detecting work memory 53*a* is a memory that is used to find a set of packets for which a session is approved.

The session detecting work memory 53*a* stores and manages information on packets in blocks in units of the same time width as the interval of periodic processes by the periodic processing unit 53e from the oldest memory block to the most recent memory block.

The session information memory 53b is a memory used to store session information for a fixed period with regard to packets for which a session has been approved.

The session information memory 53b stores and manages information on packets in blocks in units of the same width as the interval of periodic processes by the periodic processing unit 53e from the oldest memory block to the most recent memory block.

The queue memory 53c is a memory used to hold packets for which a session has not been approved for a period necessary to output the packets in the chronological order of packets.

Furthermore, the queue memory 53c stores and manages information on packets in blocks in units of the same width as the interval of the periodic processes by the periodic processing unit 53e from the oldest memory block to the most recent memory block.

Here, the fact that a session is approved is assumed to mean that communication parties exist (communication is performed in both way within a fixed period rather than in one way). The session determination/separation unit 53 has in advance condition information regarding the success or failure of the approval of a session. Here, examples of conditions for making a determination that a session is approved are shown below.

(X) In the Case of Communication Using IPv4/TCP (Transmission Control Protocol)

When an SYN (Synchronize) packet is sent from a host A to a host B, in a case in which a corresponding SYN/ACK (ACKnowledgement) packet is sent back from the host B to the host A within a fixed period, the host A and the host B are handled as a "set".

At this point, the term "corresponding" unit that there is no contradiction among "Transmission source port number", "Transmission destination port number", "Sequence Number", "Acknowledgement Number", and the like.

(Y) In the Case of Communication Using IPv4/UDP (User Datagram Protocol)

When a UDP packet is sent from the host A to the host B, in a case where, within a fixed period, a corresponding UDP packet is sent back from the host B to the host A, the host A and the host B are handled as a "set". Here, the term "corresponding" unit that there is no contradiction among "Transmission source port number" and "Transmission destination port number".

(Z) In the Case of Communication Using IPv4/ICMP (Internet Control Message Protocol)

When "ICMP_ECHO", "ICMP_TIMESTAMP", "ICMP_INFO_REQUEST", or "ICMP_ADDRESS" is transmitted from the host A to the host B, in a case in which, within a fixed period, "ICMP_ECHOREPLY", "ICMP_TIMESTAMPREPLY", "ICMP_INFO_REPLY", or "ICMP_ADDRESSREPLY" is sent back from the host B to the host A, respectively, the host A and the host B are handled as a "set".

Furthermore, the session determination/separation unit 53 is also constituted by data processing unit 53d, periodic processing unit 53e, timer unit 53f that periodically generates a time event or a trigger, task queue unit 53g, which is a ring buffer memory (FIFO), that stores packet information of the time series of packets received from the packet capture unit 52, and a time event or a trigger from the timer, and task management unit 53h that periodically monitors the task queue unit 53g and that starts up a process corresponding to the content of the task in a case where there is some sort of task in the task queue.

When a packet with which a session corresponding to the acquired packet is approved is detected from the packets stored in the oldest memory block of the session detecting work memory 53a, the data processing unit 53d appends (attaches a mark indicating that a session has been approved) approval information indicating that the session has been approved to the relevant acquired packet, and stores it in the most recent memory block of the session detecting work memory 53a.

The periodic processing unit 53e determines that the acquired packet in the session detecting work memory in which a packet with which the corresponding session is approved has not been stored has a session approved result when approval information indicating that the session has been approved is appended to the same packet (same type of packet, the same type of packet information extracted by the packet capture unit 52) and is recorded in the session information memory 53b, generates session information on the basis of the relevant session, and stores this packet in the most recent memory block of the session information memory 53b.

The session information generated by the periodic processing unit 53e includes at least one of the session start time, the length of the session, the orientation of the session, the protocol information, and the status (during communication/completion) of the session.

The periodic processing unit 53e extracts information on packets in the oldest memory block of the session information memory 53b, processes the set of "transmission source IP address, transmission destination IP address, and service" so as to be unique, and generates session feature information.

Furthermore, the periodic processing unit 53e determines that the acquired packet in the session detecting work memory 53a in which a packet with which the corresponding session is approved has not been stored, approval information indicating that the session has not been approved having not been appended to the same packet (the same type of packet) in the session information memory 53b, is a session non-approved packet, stores this packet in the queue memory, stores this packet the session non-approved packet information, and stores this packet in the queue memory 53c.

Description of Operations

With such a configuration, the improper communication detection device of the present disclosure performs the following operations (1) to (3), (I-1) and (I-2), (ii-1) to (ii-6), (III-1) to (III-3), and (IV-1) to (IV-5).

(1) Each time the packet capture unit 52 captures a traffic, the packet capture unit 52 extracts packet information, and inputs it to the task queue unit 53g.

(2) The timer 53f periodically inputs time information to the task queue unit 53g.

(3) The session determination/separation unit 53 performs "(I) data processing" and "(II) periodic process". Here, the task management unit 53h monitors the task queue unit 53g. In a case where there are tasks, the task management unit 53h extracts one task. When the task is packet information, the session determination/separation unit 53 performs "(I) data processing", and when the task is a time event, the session determination/separation unit 53 performs "(II) periodic process".

Figure 4:
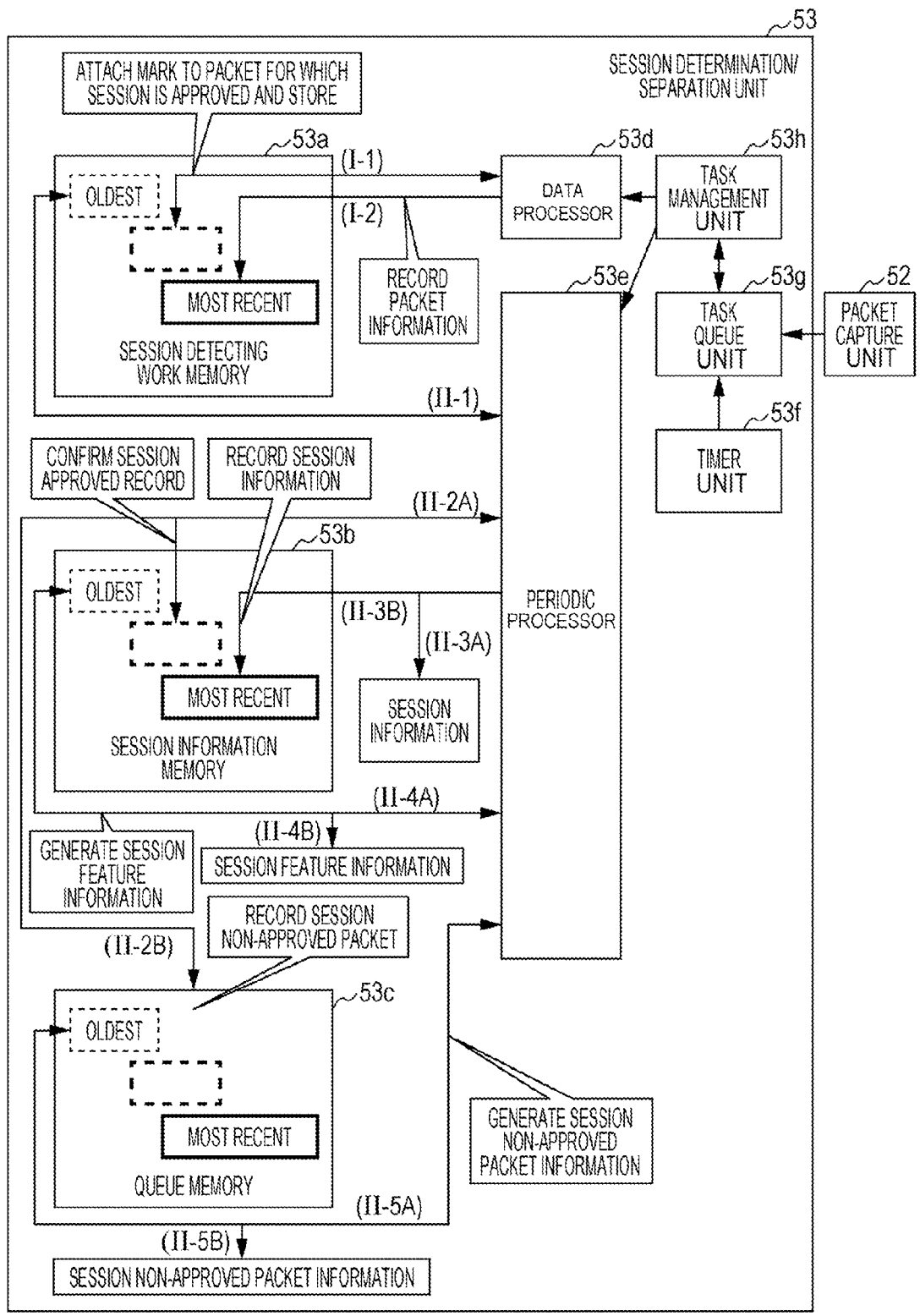
FIG. 4 is an operation illustration illustrating a session determination/separation unit of an improper communication detection device according to the present disclosure.
Figure 5:
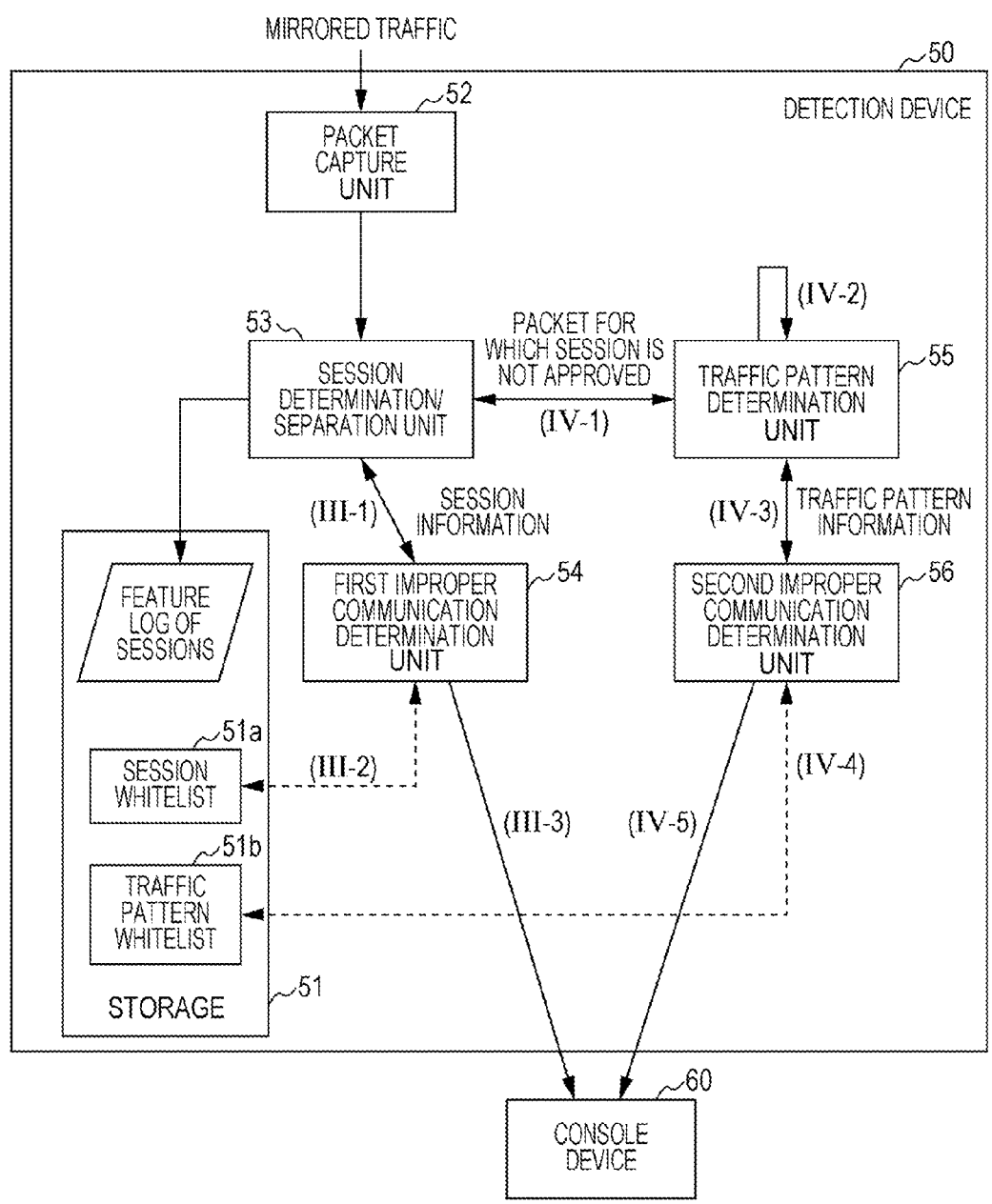
FIG. 5 is an operation diagram illustrating an improper communication detection device according to the present disclosure.

FIG. 4 is an operation illustration of a session determination/separation unit of the improper communication detection device of the present disclosure. FIG. 5 is an operation illustration of the improper communication detection device of the present disclosure. Hereinafter, a description will be given in accordance with a processing number indicating each of operation processes of (I-1) and (I-2), (II-1) to (II-5), (III-1) to (III-3), and (IV-1) to (IV-5) in FIGS. 4 and 5. Here, (I-1) and (I-2) describe the operation of the "data processing", and (II-1) to (II-5) describe the operation of the "periodic process".

(I) Data Processing (I-1)

The data processing unit 53d searches packets stored in each memory block in the order starting from the oldest memory block of the session detecting work memory 53a to a new memory block for a packet (packet acquired by the packet capture unit 52) with which a session is approved, which is stored in the task queue unit 53g.

(I-2)

When the data processing unit 53d detects a "packet with which a session is approved" with regard to the acquired packet, the data processing unit 53d appends approval information (puts a mark that the session has been approved) with regard to the relevant acquired packet.

Furthermore, the data processing unit 53d stores (adds) information on the relevant captured packet to which approval information indicating that the session has been approved is appended in the most recent memory block of the session detecting work memory 53a.

(II) Periodic Process (II-1)

The periodic processing unit 53e obtains information on all the packets contained in the memory block from the oldest memory block of the session detecting work memory 53a.

The periodic processing units 53e checks the information of each packet, and confirms whether or not the information indicating that the session has been approved has been appended (a mark that the session has been approved is contained). The periodic processing unit 53e determines that the packet to which information indicating that the session has been approved has been appended (mark indicating that the session has been approved is contained) is such that the "session has been approved".

(II-2)

The periodic processing unit 53e searches the session information memory so as to confirm whether or not the packet to which the information indicating that the session has been approved has not been appended (mark indicating that the session has been approved is not contained) contains a record that the session has been approved within a past fixed time period (II-2A).

When the periodic processing unit 53e can detect a record that the session has been approved, the periodic processing unit 53e determines this packet to be such that the session has been approved.

The periodic processing unit 53e determines a packet with no such record to be one for which the "session has not been approved", and writes information on the packet into an appropriate block in the queue memory 53c by ensuring that the data is in chronological order (II-2B).

(II-3)

The periodic processing unit 53e generates the relevant session that has been determined to be that "the session has been approved" as session information (II-3A), and writes this session information in the most recent memory block of the session information memory 53b (II-3B).

(II-4)

The periodic processing unit 53e extracts information on the packets in the oldest memory block of the session information memory 53b (II-4A), and performs processing so that the set of the "transmission source IP address, transmission destination IP address, and service" becomes unique, and generates session feature information (II-4B).

(II-5)

The periodic processing unit 53e extracts information on packets in the block from the oldest memory block of the queue memory 53c (II-5A), rearranges the packets in the chronological order, and generates "session non-approved packet information" (II-5B).

When the periodic process is completed, the first improper communication determination unit 54 performs the following operations (III-1) to (III-3), and the traffic pattern determination unit 55 and the second improper communication determination unit 56 perform the following operations (IV-1) to (IV-5).

(III-1)

After the periodic process, the first improper communication determination unit 54 obtains the "session information" generated by the periodic processing unit 53e.

(III-2)

On the basis of the session information generated by the session determination/separation unit 53, the first improper communication determination unit 54 compares the session information with the session whitelist 51a stored in the storage unit 51, and detects communication related to the relevant session information as improper communication when the session information does not match any session in the session whitelist 51a.

(III-3)

When the first improper communication determination unit 54 detects improper communication, the first improper communication determination unit 54 transmits the detection result to the console device 60. The console device 60 displays the information related to the improper communication on the basis of the detection result received from the first improper communication determination unit 54.

(IV-1)

After the periodic process, the traffic pattern determination unit 55 obtains "session non-approved packet information" generated by the periodic processing unit 53e.

(IV-2)

The traffic pattern determination unit 55 generates traffic pattern information on the basis of the "session non-approved packet information" generated by the periodic processor 53e.

(IV-3)

The second improper communication determination unit 56 obtains the traffic pattern information generated by the traffic pattern determination unit 55.

(IV-4)

The second improper communication determination unit 56 compares the traffic pattern information generated by the traffic pattern determination unit 55 with the traffic pattern whitelist 51b, and detects communication related to the relevant traffic pattern information as improper communication when the traffic pattern information does not match any traffic pattern in the traffic pattern whitelist 51b.

(IV-5)

When the second improper communication determination unit 56 detects improper communication, the second improper communication determination unit 56 transmits the detection result to the console device 60. The console device 60 displays information related to the improper communication on the basis of the detection result received from the second improper communication determination unit 56.

As a result, the improper communication detection system according to the present disclosure includes storage unit for prestoring a session whitelist, which is a list of sessions that can be generated in the plant network; a session determination/separation unit configured to make a determination as to a success or failure of session approval on the basis of the acquired packet and configured to generate session information indicating an approved session; and first improper communication detection unit for comparing the session information generated by the session determination/separation unit with the session whitelist, and for detecting communication related to the relevant session as improper communication when the session information does not match any session in the session whitelist. Thus, the improper communication detection system can detect improper traffic (communication of worms, bots, and viruses, setting mistakes, man-made attacks, etc.) that can become a menace to security in the plant network, and a symptom thereof without relying on log analysis of an FW (firewall), and disposal and operation/running of an IDS (intrusion detection system).

Furthermore, in the improper communication detection system according to the present disclosure, the storage unit prestores a traffic pattern whitelist that is a list of traffic patterns that can be generated in the plant network, and the session determination/separation unit includes traffic pattern determination unit for making a determination as to a success or failure of session approval on the basis of the acquired packets and generating session non-approved packet information indicating a packet for which a session has not been approved, and for generating traffic pattern information indicating a traffic pattern of a packet for which a session has not been approved on the basis of the session non-approved packet information, and second improper communication detection unit for comparing the generated traffic pattern information with the traffic pattern whitelist, and detecting communication related to the relevant traffic pattern information as improper communication when the traffic pattern information does not match any traffic pattern in the traffic pattern whitelist. Thus, when a session for UDP is to be approved, even with communication using a protocol that makes the transmission of a response packet unnecessary, the improper communication detection system can detect improper traffic (communication of worms, bots, and viruses, setting mistakes, man-made attacks, etc.) that can become a menace to security in the plant network, and a symptom thereof without relying on log analysis of an FW, and disposal and operation/running of an intrusion detection system (IDS).

That is, the improper communication detection system of the present disclosure is configured as described above. Consequently, since an improper traffic can be detected in real time and also a packet (improper communication) that does not match a whitelist can be detected in real time. Thus, the improper communication detection system is effective in that not only a known attack, but also a symptom of menace to security can be detected. For this reason, since a symptom of security menace can be detected before attack traffic flows, the improper communication detection system is effective in that influence on operations of field devices is comparatively decreased.

Furthermore, the improper communication detection system of the present disclosure is configured as described above, and thus is effective in that in a case where a worm or a bot virus is infected in the plant network (even the case through a network or the case through a USB memory rather than through a network), a symptom of improper traffic due to an activity of a worm or a bot can be quickly detected.

Other Examples of Configuration

In addition to the configuration of the first embodiment, the improper communication detection system of the present disclosure may be configured such that the storage unit 51 stores a blacklist, third improper communication determination unit 57, after the first or second improper communication determination unit detects improper communication compares the improper communication with a blacklist, and displays information associated with the causes that generated improper traffic on the console device 60.

Here, the blacklist refers to a list of communication destinations having a problem, such as those that are known as communication destinations of bots, or a list of traffic patterns of known worms.

As a result, the improper communication detection system is effective in that measures for removing the generation causes of improper traffic can be supported, and prioritization of measures can be made.

What is claimed is:

1. An improper communication detection system that acquires packets that are circulated through a plant network by mirroring, and detects improper communication, the improper communication detection system comprising:
   a storage unit for prestoring a session whitelist, which is a list of sessions that can be generated in the plant network;
   a session determination/separation unit configured to make a determination as to a success or failure of session approval on a basis of the acquired packet and configured to generate session information indicating an approved session; and
   a first improper communication detection unit for comparing the session information generated by the session determination/separation unit with the session whitelist, and for detecting communication related to the relevant session as improper communication when the session information does not match any session in the session whitelist,
   wherein the storage unit prestores a traffic pattern whitelist that is a list of traffic patterns that can be generated in the plant network,
   wherein the session determination/separation unit includes:
      a traffic pattern determination unit for making a determination as to a success or failure of session approval on a basis of the acquired packets and generating session non-approved packet information indicating a packet for which a session has not been approved, and for generating traffic pattern information indicating a traffic pattern of a packet for which a session has not been approved on a basis of the session non-approved packet information; and
      a second improper communication detection unit for comparing the generated traffic pattern information with the traffic pattern whitelist, and detecting communication related to the relevant traffic pattern information as improper communication when the traffic pattern information does not match any traffic pattern in the traffic pattern whitelist,
   wherein the session determination/separation unit includes a whitelist generator for generating session feature information indicating information of sessions that were approved in the past on a basis of the acquired packets, and for generating the session whitelist on basis of the session feature information,
   wherein the session determination/separation unit includes:
      a session detecting work memory for storing the acquired packets in a time-series manner in a plurality of memory blocks;

a session information memory for storing the packets for which the session has been approved in a time-series manner in a plurality of memory blocks;

a data processor for, when a packet with which a session corresponding to the acquired packet is approved is detected from the packets stored in the oldest memory block of the session detecting work memory, appending approval information indicating that the session was not approved to the relevant acquired packet, and for storing the packet in the most recent memory block of the session detecting work memory; and a periodic processor for determining that the acquired packet in the session detecting work memory in which a packet with which the corresponding session is approved has not been stored has a session approved result when approval information indicating that the session has been approved is appended to the packet and is recorded in the session information memory, generating session information on a basis of the relevant session, and storing this packet in the most recent memory block of the session information memory.

2. The improper communication detection system according to claim 1, wherein the session determination/separation unit includes a queue memory for storing the packets for which the session has not been approved, and wherein the periodic processor determines that the acquired packet in the session detecting work memory in which a packet with which a corresponding session is approved has not been stored, approval information indicating that the session has been approved having not been appended to the packet in the session information memory, is a session non-approved packet, stores this packet in the queue memory, and generates the session non-approved packet information on the basis of the relevant packet.

3. An improper communication detection system that acquires packets that are circulated through a plant network by mirroring, and detects improper communication, the improper communication detection system comprising:

a storage unit for prestoring a session whitelist, which is a list of sessions that can be generated in the plant network;

a session determination/separation unit configured to make a determination as to a success or failure of session approval on a basis of the acquired packet and configured to generate session information indicating an approved session; and a first improper communication detection unit for comparing the session information generated by the session determination/separation unit with the session whitelist, and for detecting communication related to the relevant session as improper communication when the session information does not match any session in the session whitelist, wherein the session determination/separation unit includes:

a session detecting work memory for storing the acquired packets in a time-series manner in a plurality of memory blocks;

a session information memory for storing the packets for which the session has been approved in a time-series manner in a plurality of memory blocks;

a data processor for, when a packet with which a session corresponding to the acquired packet is approved is detected from the packets stored in the oldest memory block of the session detecting work memory, appending approval information indicating that the session was not approved to the relevant acquired packet, and for storing the packet in the most recent memory block of the session detecting work memory; and a periodic processor for determining that the acquired packet in the session detecting work memory in which a packet with which the corresponding session is approved has not been stored has a session approved result when approval information indicating that the session has been approved is appended to the packet and is recorded in the session information memory, generating session information on a basis of the relevant session, and storing this packet in the most recent memory block of the session information memory.

* * * * *